United States Patent
Otani et al.

(10) Patent No.: US 6,449,250 B1
(45) Date of Patent: Sep. 10, 2002

(54) METHOD FOR SWITCHING CENTRAL DEVICE AND A CABLE MODEM SYSTEM USING THE SAME

(75) Inventors: Keiichi Otani; Takaya Yamamoto, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/170,673

(22) Filed: Oct. 13, 1998

(30) Foreign Application Priority Data

Jan. 28, 1998 (JP) .......................................... 10-015902

(51) Int. Cl.[7] .............................................. H04L 12/46
(52) U.S. Cl. ....................................... 370/219; 370/220
(58) Field of Search ................................ 370/216–220, 370/228; 714/6, 13

(56) References Cited

U.S. PATENT DOCUMENTS

| | | | | |
|---|---|---|---|---|
| 5,649,089 | A | * | 7/1997 | Kilner ............................ 714/6 |
| 5,933,474 | A | * | 8/1999 | Kipp ........................... 370/217 |
| 6,111,852 | A | * | 8/2000 | Leung et al. ................ 370/217 |
| 6,148,415 | A | * | 11/2000 | Kobayashi et al. ............ 714/13 |
| 6,201,788 | B1 | * | 3/2001 | Ishiwatari .................... 370/228 |
| 6,226,261 | B1 | * | 5/2001 | Hurtta et al. ................ 370/219 |
| 6,252,846 | B1 | * | 6/2001 | Fujita ........................ 370/220 |
| 6,269,077 | B1 | * | 7/2001 | Matsumura et al. ......... 370/218 |

* cited by examiner

Primary Examiner—Salvatore Cangialosi
(74) Attorney, Agent, or Firm—Katten Muchin Zavis Rosenman

(57) ABSTRACT

A method for switching a plurality of central devices including N working central devices and one protection central device of a N+1 redundancy structure provided on a LAN center, to the CATV transmission path side of which terminal devices are connected each through a cable modem, having router functions forming segments respectively at the sides of the LAN center and the CATV transmission path, and a working central device transmitting routing information of the segment on the CATV transmission path side to inform the LAN center segment of an existence of the segment on the transmission path side, so that the terminal devices are connected to appropriate networks via the LAN center, the method comprising the steps of maintaining control information of the plurality of working central devices and the protection central device to be monitored, detecting failure of a working central device by regularly polling the N working central devices, switching the detected, failed working central device to the protection central device to connect the plurality of central devices to the CATV transmission path, transferring the maintained control information of the failed central device to the protection central device, and setting the protection central device to an active status according to the transferred control information.

19 Claims, 20 Drawing Sheets

| CABLE MODEM ID NUMBER |
|---|
| 00000001 |
| 00000002 |
| ~ |
| 00001001 |
| 00001002 |

FIG. 5A

| FORWARD RF FREQUENCY | 36MHz |
|---|---|
| DOWNWARD RF FREQUENCY | 250MHz |

FIG. 5B

| DESTINATION IP ADDRESS | GATEWAY IP ADDRESS | INTERFACE No. | HOP No. |
|---|---|---|---|
| 172.16.1.0 | 172.16.1.1 | 1 | 0 |
| 10.1.1.0 | 10.1.1.1 | 2 | 0 |
| 172.16.2.0 | 172.16.1.100 | 1 | 1 |
| 172.17.0.0 | 172.16.1.101 | 1 | 1 |
| ~ | ~ | ~ | ~ |
| $IP_{R01}$ | $IP_{E0}$ | 1 | 1 |
| $IP_{R11}$ | $IP_{E1}$ | 1 | 1 |

FIG. 8

| DESTINATION IP ADDRESS | DESTINATION MAC ADDRESS |
|---|---|
| 172.16.2.1 | 0000E000001 |
| 172.16.2.2 | 0000E000002 |
| 172.16.2.3 | 0000E000003 |
| ~ | ~ |
| $IP_{R01}$ | $MAC_{\#OR}$ |

FIG. 9

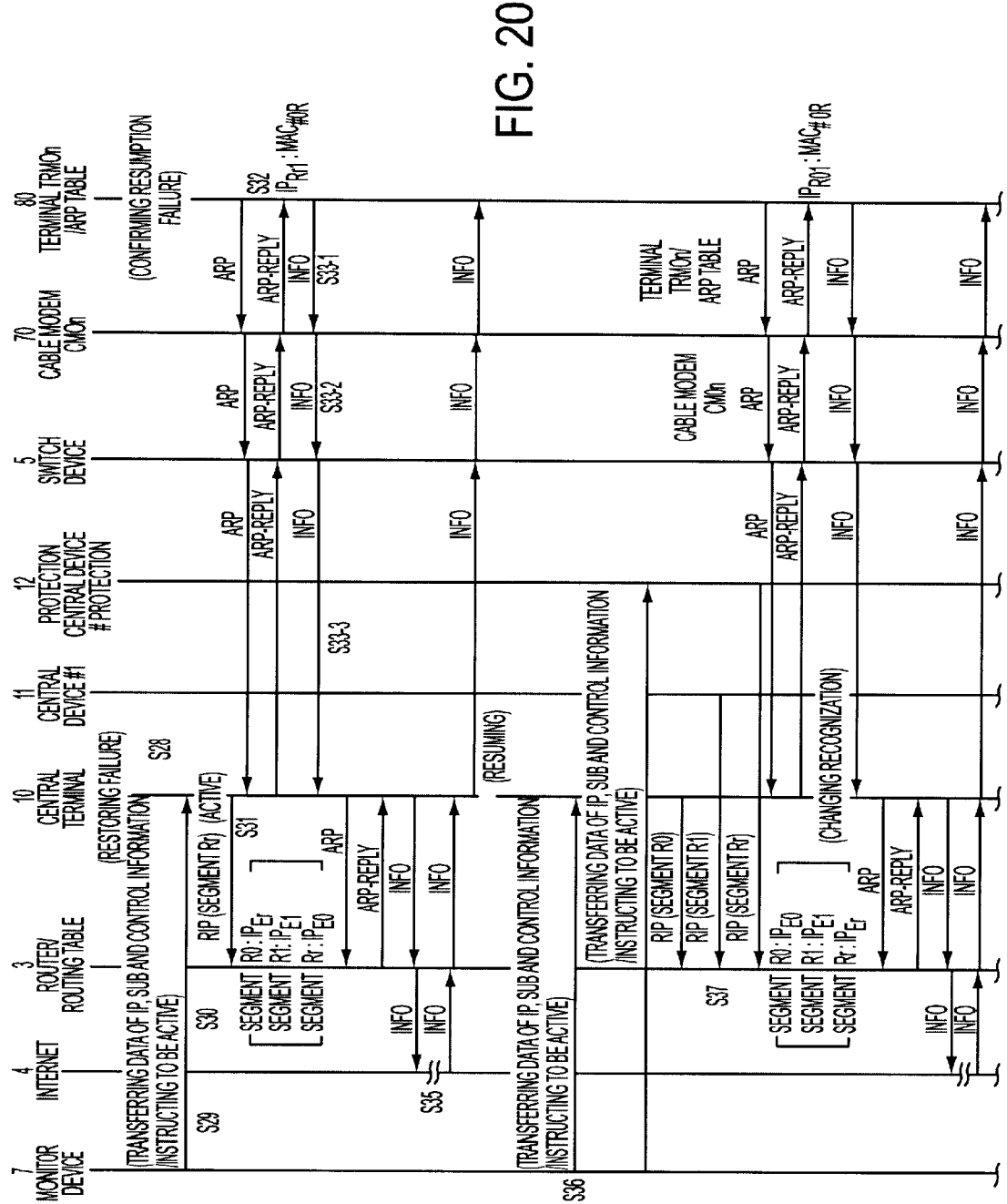

METHOD FOR SWITCHING CENTRAL DEVICE AND A CABLE MODEM SYSTEM USING THE SAME

BACKGROUND OF THE INVENTION

1. Field of the Invention

The present invention relates to a method for switching central devices when a failure occurs in a cable modem system, which forms a local area network (LAN) by using a CATV transmission path, and a cable modem system using the method.

2. Description of the Related Art

In recent years, cable modem systems have been put in practical use, where a CATV transmission path is taken as an access network, and users can connect from their homes to Internet through a LAN interface.

These systems target for services to general public. Therefore, there is a need for obtaining a license as the first-class communication service. To get the license, high reliability is required as a system.

The conventional LAN system will be now considered. In the conventional LAN system, although a main section for inter-routers connection can be formed having redundancy, it is impossible to form sub sections directly accommodating terminals to have redundancy. The reason is because it is possible to detect a failure on a router to be connected and automatically set a bypass route by transmitting and receiving a routing protocol, such as a RIP, between routers.

However, it is general that such the routing protocol is not supported for a terminal such as a personal computer. Therefore, LAN connections are not set according to gateway definition of which settings can be changed manually.

Therefore, when a failure occurs on a router for directly storing terminals, it is impossible to perform the LAN connections by using the bypass route without changing settings of the terminal.

SUMMARY OF THE INVENTION

Accordingly, it is an object of the present invention to provide a method for switching central devices to maintain a LAN connection by using a redundancy central device without changing settings of terminals, when a failure occurs on a central device having a router function, which directly accommodates the terminals and a cable modem system using the method.

The above-described object is achieved by a cable modem center device having a plurality of central devices including N working central devices and one protection central device of a N+1 redundancy structure provided on a LAN center, to the CATV transmission path side of which terminal devices are connected each through a cable modem, and having router functions forming segments respectively at the sides of the LAN center and the CATV transmission path, and a working central device transmitting routing information of the segment on the CATV transmission path side to inform the LAN center segment of an existence of the segment on said transmission path side, so that the terminal devices are connected to appropriate networks via the LAN center, the cable modem center device comprising a switch device provided between said plurality of central device and said CATV transmission path for switching a failed one of the plurality of central devices to said protection central device and connecting said plurality of center devices and said CATV transmission path.

The cable modem center devices further comprises a monitor device for monitoring said plurality of central devices, maintaining control information of the plurality of working central devices and the protection central device to be monitored, detecting failure of a working central device by regularly polling the N working central devices, switching the detected, failed working central device to the protection central device to connect the plurality of central devices to the CATV transmission path, transferring the maintained control information of the failed central device to the protection central device, and setting the protection central device to an active status according to the transferred control information.

Further, in one preferred mode, it is another feature that the control information of the plural working central devices and the protection device to be monitor device includes a network address of a segment on the CATV transmission path and control information of a cable modem stored under the plural working central devices and the protection devices.

Alternatively, in another mode, the monitor device includes a physical address (MAC address) of the segment on the transmission path of the working central device as the maintained information and the information transferred to the protection central device, and said protection central device additionally uses said physical address to activate.

Furthermore, in one mode, the failed central device stops sending routing information after a failure is informed.

Alternatively, it is a further feature that distance (HOP number) or cost data of the routing information the switched protection central device sends is made to be smaller than that of the information the working central device sends.

Further, in one embodiment, it is informed to the data sender that the failed central device is switched to the protection central device according to an internet control message protocol (ICMP) redirect message when receiving the data to the segment on the CATV transmission path after a failure is informed.

It is other feature that a resumption confirmation is performed by connecting the terminal and the failed central device, the control information of the protection central device is transferred from the monitor device to the failed central device, and the failed central device is made to be active according to the transferred information after the failure on the failed central device is restored.

Further, objects and features of the present invention become clear by the description for explaining embodiments according to the attached drawings.

BRIEF DESCRIPTION OF THE DRAWINGS

FIGS. 5A and 5B show control information of a cable modem in the first embodiment of FIG. 2.

FIG. 8 illustrates one example of a routing table.

FIG. 9 shows an ARP table in a terminal.

FIG. 20 shows an example of an operational sequence for confirming the resumption and resuming the system after restoring a failure on a central device (#0) 10 switched to a central device (#protection) 12.

DESCRIPTION OF THE PREFERRED EMBODIMENTS

Figure 1:
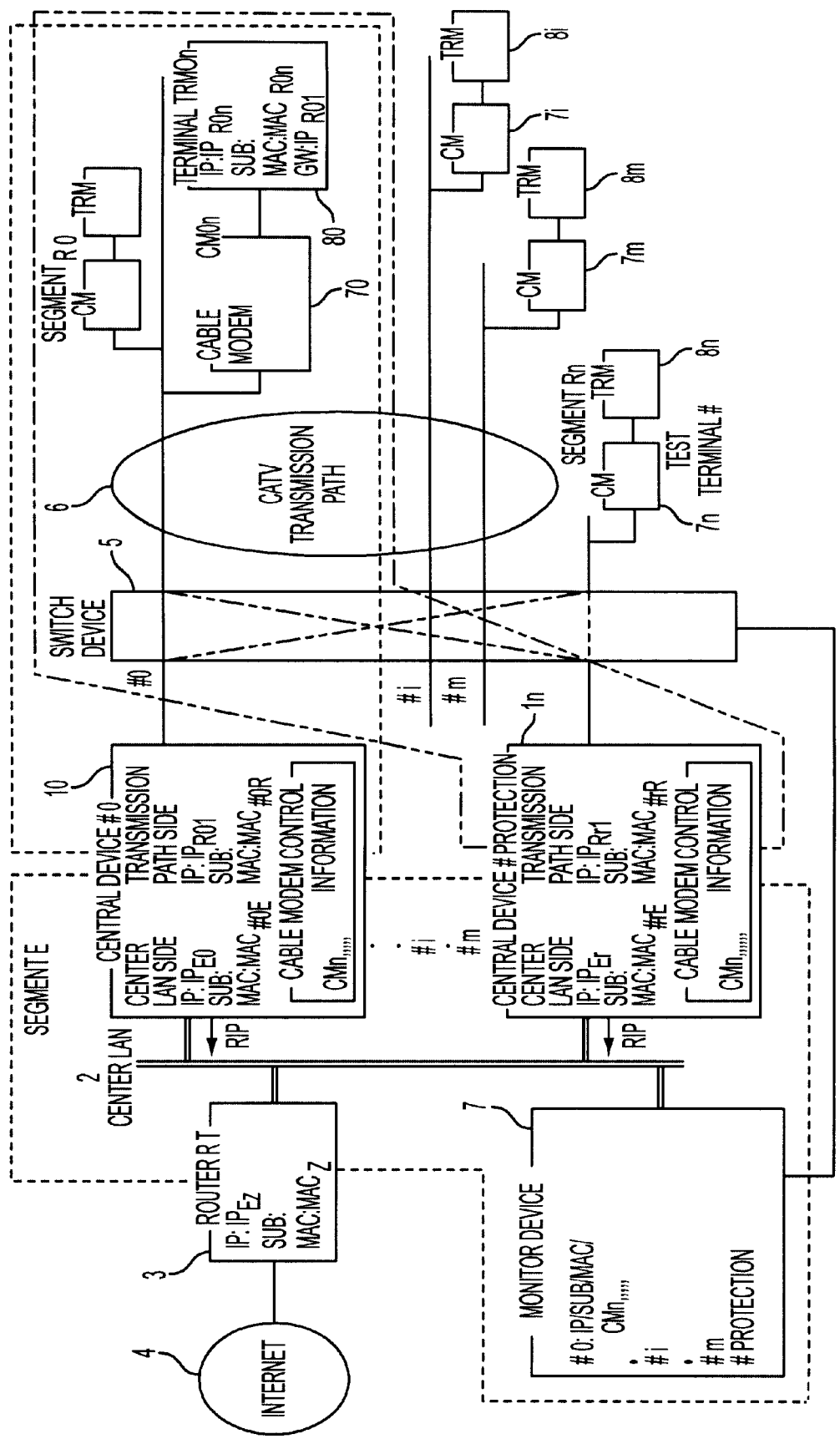
FIG. 1 is a structural block diagram of the present invention.

Embodiments according to the present invention will be now explained in accompanying with the attached drawings. Throughout the following descriptions, the same reference numerals and symbols are used to denote and identify corresponding or identical components.

FIG. 1 is a block diagram explaining the principle of the present invention. In FIG. 1, central devices (#0 to #m) 10 to 1 m and a central device (#protection) in are connected to an Internet 4 via a center LAN 2 and a router (RT) 3.

IP addresses and media access control (MAC) addresses [$(IP_{E0}, MAC_{\#0E})$ to $(IP_{Er}, MAC_{\#rE})$] are set for each of the above-described devices, belonging to a segment E of the center LAN 2.

In this example, the protection central device 1n includes function for transmitting a routing protocol, such as a routing information protocol (RIP). A HOP number the protection central device 1n transmits, i.e., a number of routers, passed trough until reaching a target or distance information, should be smaller than that of a working central device. Or the HOP number may be expressed by the corresponding cost information.

The working central devices (#1~#m) 10 and the protection central device 1n are connected through a physical switch device 5 to test cable modems CM and terminals TRM provided at the forward section or central devices.

For example, IP and MAC addresses ($IP_{R01}$, $MAC_{\#OR}$) and ($IP_{R0n}$, $MAC_{R0n}$) of a segment R0 on the transmission path are respectively set to the device 10 and a test terminal (TRM0n) 80, which is connected through a subordinate cable modem 70 to the device 10.

IP and MAC addresses ($IP_{Rr1}$, $MAC_{\#rR}$) and ($IP_{Rrn}$, $MAC_{Rrn}$) of a segment Rn on the transmission path side are respectively set to the protection device 1n and a test terminal (TRMrn) 8n, which is connected through a subordinate cable modem 7n to the device 12.

A case where a failure occurs on the ith central device (#i) 1i will be now considered. Then, the IP and MAC addresses of the protection device 1n are set to addresses ($IP_{Ri1}$, $MAC_{\#iR}$), which are the same as those of the central device 1i.

A switch device 5 physically connects the devices 10 to 1m to the CATV transmission path 6. When a failure occurs on the device 1i, the switch device 5 disconnects the device 1i and connects the protection device 1n to the transmission path 6.

An IP address ($IP_{R01}$) on the transmission path side of the device 10 is set as a definition of a gateway in the terminal 80. The failed device 1i stops sending the routing information. When the terminal 1i receives data sent to a segment on the transmission path side, the terminal 1i sends an Internet control message protocol (ICMP) redirect message to the sender.

As described above, in the present invention, the device 10 sends RIP information of a segment R0 on the transmission path side to a segment E of the center LAN 2 on a normal condition. On the other hand, the protection device 1n sends the RIP information of a segment Rn on the transmission path side. Therefore, the router 3 recognizes a segment R0 exists in the forward section of the central device 10.

Additionally, the switch device 5 physically connects the device 10 to the CATV transmission path 6. Therefore, the terminal 80 uses the device 10 as a gateway and therefore, it can be connected to the Internet 4 through the center LAN 2 and the router 3.

A case where a failure occurs on the device 10 will be now considered for instance. Then, the monitor device 7 detects the failure by polling. The switch device 5 disconnects the device 10 and connects the protection device 1n to the CATV transmission path 6.

Simultaneously, IP and MAC addresses ($IP_{R0}$, $MAC_{\#0R}$), that are the same as those of the device 10, are set to the segment Rn on the transmission path side of the protection device 1n. Then, the protection device 1n starts sending the RIP information of the segment R0 on the transmission path side to the segment E of the center LAN 2.

The router 3 recognizes that the segment R0 exists in the forward section of the protection device 1n by stopping sending the RIP information of the failed device 10, reducing the HOP number of the above-described RIP information smaller than that of the device 10, or directly informing from the failed central device 10 with the ICMP redirect message.

The protection device in inherits the IP and MAC addresses ($IP_{R01}$, $MAC_{\#OR}$) of the segment R0 on the transmission path side of the device 10 used as a gateway from the protection device 1n as they are. Therefore, it is also possible that the terminal 80 can be connected to a LAN, continuously.

Figure 2:
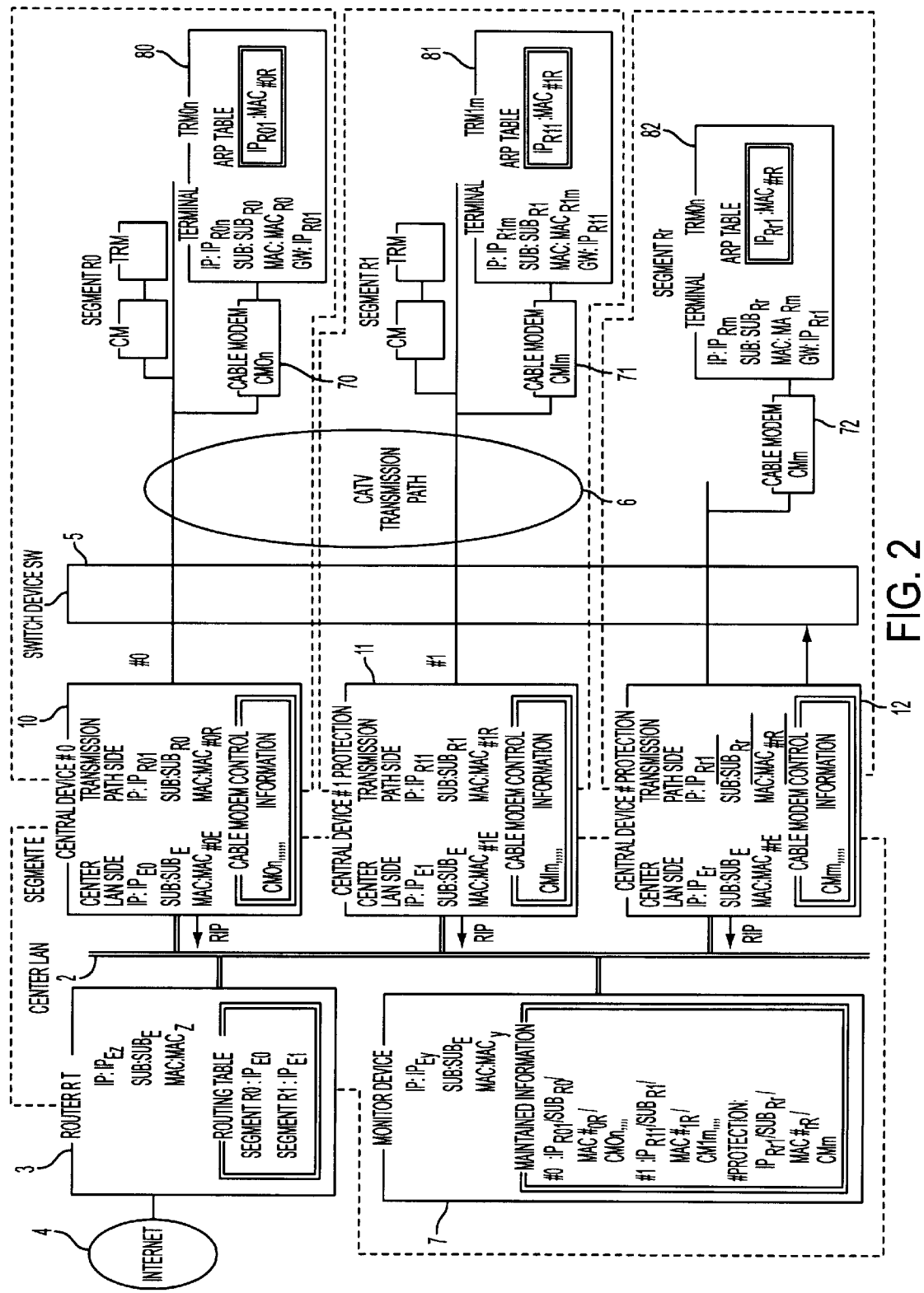
FIG. 2 is a block diagram of a first embodiment of the present invention.

FIG. 2 illustrates a structural diagram of one embodiment of the present invention. A cable modem system is formed of two working central devices (#0, #1) 10 and 11 and a protection device (#protection) 12.

Figure 3:
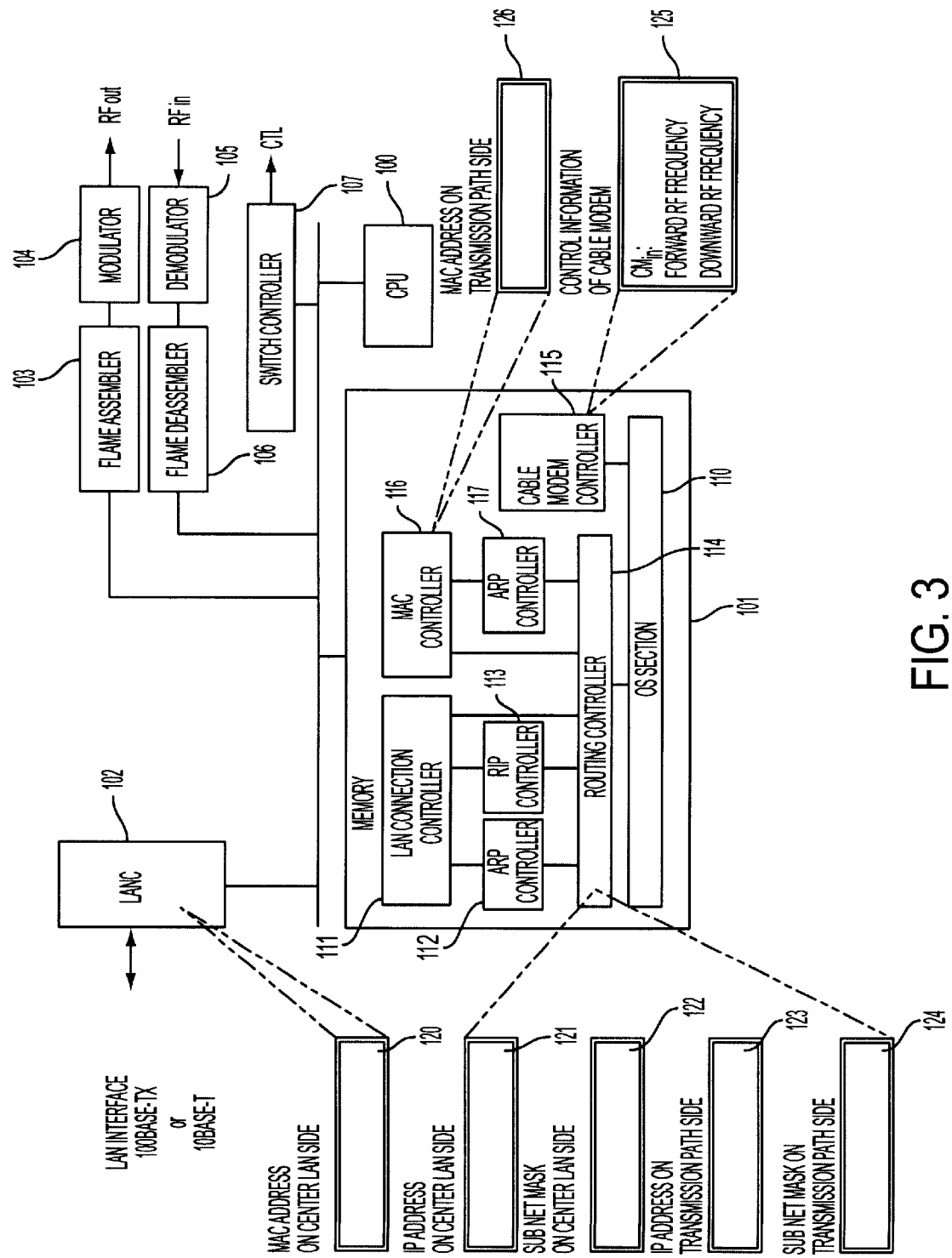
FIG. 3 is a structural block diagram of a central device in the first embodiment shown in FIG. 2.
Figure 4:
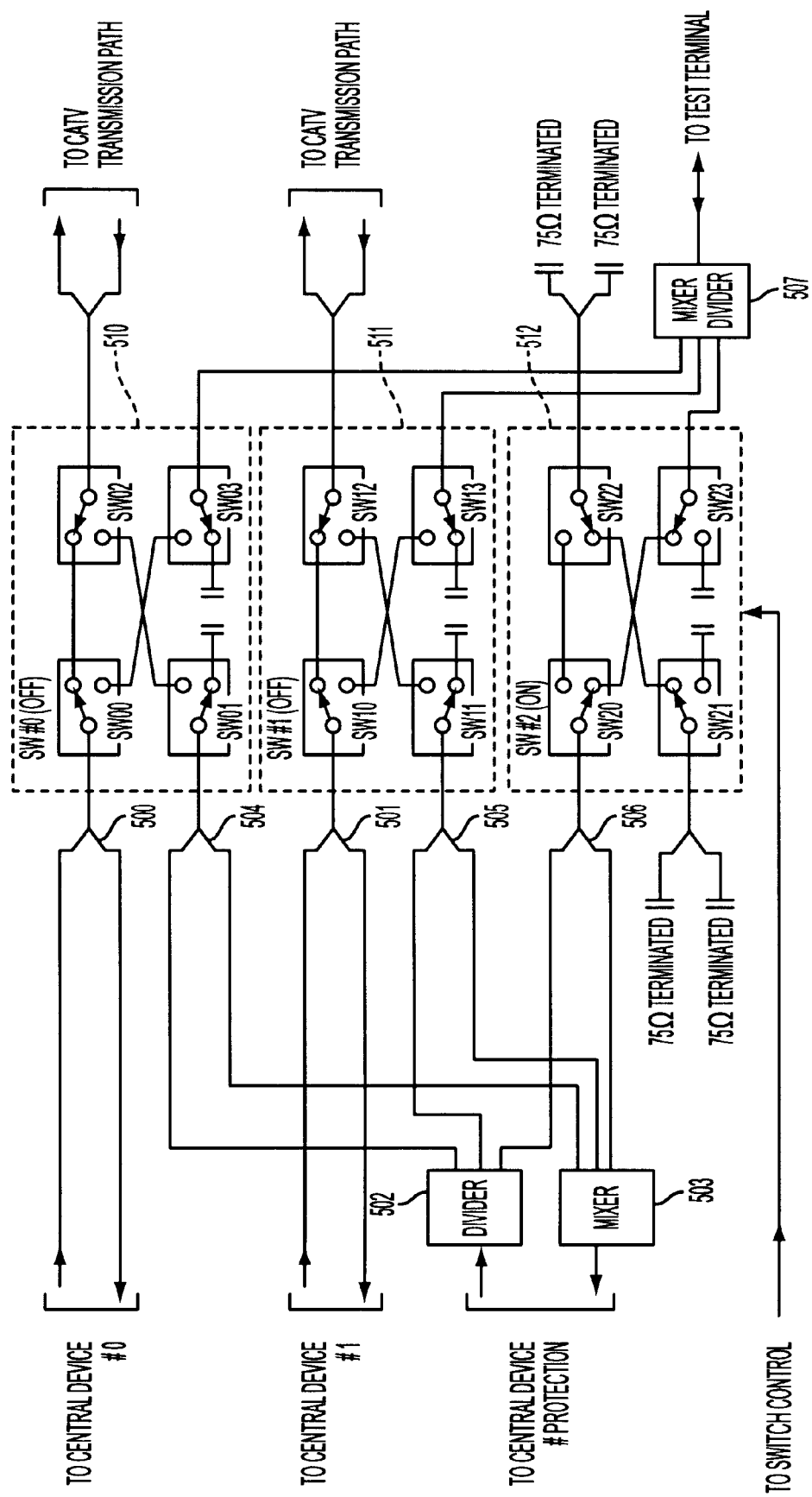
FIG. 4 is a structural block diagram of a switch of the first embodiment shown in FIG. 2.

In FIG. 2, the same numerals and symbols are used to denote and identify corresponding or identical components shown in FIG. 1. A structural block diagram of a central device is shown in FIG. 3, and a structural block diagram of a switch device 5 is shown in FIG. 4.

Each of central devices 10 to 12 has a commonly used structure. As illustrated in FIG. 3, each of central devices 10 to 12 includes a CPU 100 for controlling an entire central device. Further, the central device includes a memory 101 for storing a system program and data. Additionally, the each device includes a LAN connector 102 for having a MAC address 120 on the center LAN 2 side and facilitating communications with the center LAN 2.

The central devices 10 to 12 further include a frame assembler 103, a modulator 104, a demodulator 105, and a frame disassembler 106. The frame assembler 103 assembles an IP packet transmitted to cable modems 70 to 72 and terminals 80 to 82 as a transmission frame, and the modulator 104 modulates the transmission frame to a RF signal and transmits it to the CATV transmission path 6. On the contrary, the demodulator 105 demodulates the RF signals received from the CATV transmission path 6 to a transmission frame, and a frame disassembler 106 disassembles the modulated transmission frame and takes an internet protocol (IP) packet out.

The central devices also include a switch controller 107 transmitting an instruction for switching to the switch device 5.

A system program is developed in on the above-described memory 101. The memory 101 includes an OS section 110, a LAN connection controller 111, and an ARP controller 112.

The OS section 110 controls the entire program system. The LAN connection controller 111 sets the MAC address on the center LAN side to the LAN connector 102 and controls the address. The ARP controller 112 maintains and administrates an address resolution protocol (ARP) table on the center LAN side and resolves the MAC address.

The memory 101 further includes a RIP controller 113 and a routing controller 114. The RIP controller 113 receives and sends the routing information between the router 3 connected to the center LAN 2 and other central devices, maintains and administrates the routing table according to the routing packet RIP. The routing controller 114 maintains IP addresses 121 and 123 on the center LAN 2 and CATV transmission path 6 sides, and performs routing the IP addresses according to the routing information administrated by the controller 113.

Moreover, the memory 101 includes a cable modem controller 115, a MAC controller 116 and an ARP controller 117. The cable modem controller 115 maintains and administrates control information of the cable modem connected to the central device through the CATV transmission path 6 (refer to ID numbers shown in (1) of FIG. 5 and upward/downward RF signal frequencies shown in (2) of FIG. 5) and executes an authorization, distance control, received or transmitted RF signal level control, and settings of RF signal frequencies to the modulator and demodulator in the cable modem. The MAC controller 116 maintains a MAC address 126 on the CATV transmission path 6 side and controls a MAC layer. The ARP controller 117 maintains and administrates the ARP table on the CATV transmission path 6 side and executes the MAC address resolution.

The switch device 5, of which detail description is illustrated in FIG. 4, mixes outputs RFout from each modulators 104 of the devices 10 and 11 and an input RFin of the demodulator 105 inside and connects to contact switches #i and i0.

In other words, a mixer 500 mixes the outputs RFout from the modulator 104 of the device 10 and the input RFin from the demodulator 105 of the device 10. The input RFin and output RFout from the device 10 are connected to a contact switch SW00 of the switch 510. On the other hand, a mixer 501 mixes an output RFout from the modulator 104 of the device 11 and an input RFin from the demodulator 105 of the device 11. The input RFin and the output RFout from the device 11 are connected to a contact switch SW00 of a switch 511.

Additionally, the working devices 10 and 11 are connected to the protection device 12 through a divider 502 and a mixer 503. An output RFout from the modulator 104 of the protection device 12 and an input RFin from the demodulator 105 in the device 12 are respectively connected to the divider 502 and the mixer 503. The input and output from the protection device 12 are mixed in mixers 504, 505 and 506 through the divider 502 and the mixer 503. The mixed signals are respectively connected to the contact switches SW01, SW11 and SW20 of the switches 510, 511 and 512.

The contact switches SW02 and SW12 of the switches 510 and 511 are connected to the CATV transmission path 6, and the contact switch SW22 of the switch 512 is terminated. The contact switches SW03, SW13 and SW23 of the switches 510, 511 and 512 are respectively connected to the test terminal after the mixer 507 mixes and divides the contact switches SW03, SW13 and SW23, individually.

In the switches 510, 511 and 512, the contact switches SWi0 and SWi1 are respectively connected to the contact switches SWi3 and SWi2 when a power is ON. When the power is OFF, the contact switch SWi0 is connected to the contact switch SWi2, and the contact switches SWi1 and SWi3 are terminated. In this example, i means 0 to 2. The above-described conditions of these switches 510, 511 and 512 can be expresses as follows:

TABLE 1

|  | SW0 | SW1 | SW2 |
|---|---|---|---|
| Normal Condition | off | off | on |
| When a failure occurs on a central device #0 | on | off | off |
| When a failure occurs on a central device #1 | off | on | off |

In other word, when the condition is normal, i.e., the devices 10 and 11 are operated, the switches 510 and 511 become OFF, and only the switch 512 becomes ON. Then, the devices 10 and 11 are respectively connected to the CATV transmission path 6.

When a failure occurs on the device 10, the protection device 12 receives information of the failure on the device 10 from the monitor device 7. Then, the switch 510 becomes ON and the switches 511 and 512 become OFF. Therefore, the device 10 is connected to the test terminal, and the protection device 12 is connected to the CATV transmission path 6 instead of the device 10.

Similarly, when a failure occurs on the device 11, the device 11 is physically switched to the protection device 12.

The monitor device 7 is formed of a hardware in which a LAN card is mounted on a personal computer. A software is formed of an OS where multi-task environment is provided, such as Windows NT, a monitor device program driven in a constant period, an automatic switching program driven when a failure occurs, and a resumption confirmation program for transmitting information manually.

The monitor program maintains a network address, i.e., an IP address, of the segment on the center LAN 2 side of a central device to be monitored including the protection device, and is driven in a predetermined period of the OS. When the central device is not replied or information of failure occurrence from the device, the automatic switching program is driven.

The automatic switching program maintains a network address, i.e., an IP address and a sub net mask, of the segment on the transmission path side of the central devices including the protection device to be monitored and the control information, such as upward/downward RF frequencies, cable modem ID number, of the cable modem stored in the segment.

Then, the information of the failed device is transmitted to the protection device by driving from the monitoring program and resetting the protection device, and therefore, the protection device becomes an active condition.

The resumption-confirming program is manually driven from a console after resuming the failed device. The program includes functions for enabling the resumption confirmation of the failed device and transferring the original information to the failed or protection devices after confirming the resumption in order to obtain the previous condition before the failure occurs.

Figure 6:
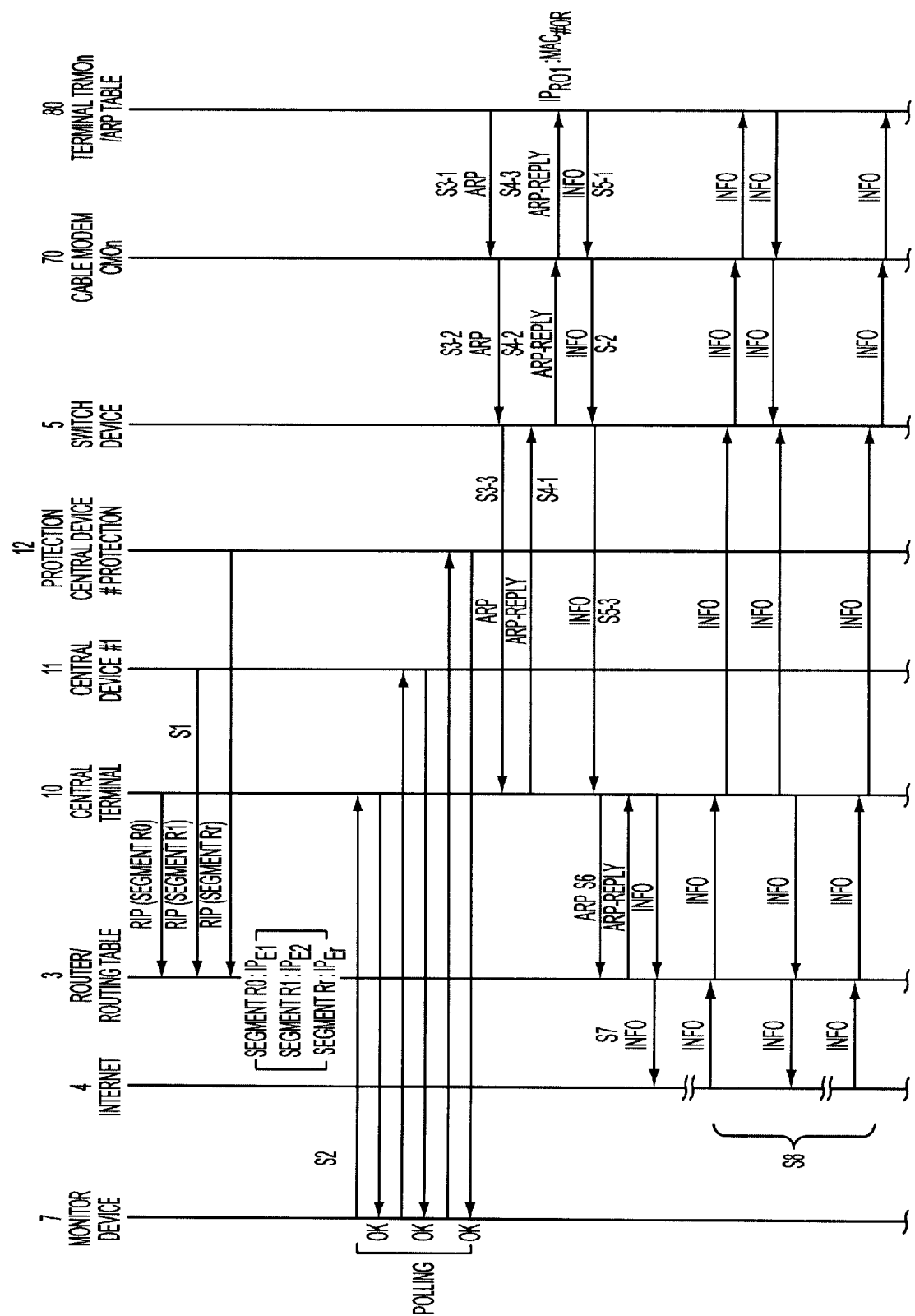
FIG. 6 illustrates a sequence flow chart of a LAN communication in a normal condition.

FIG. 6 shows a sequence of a LAN communication in a normal condition. Devices 10 and 11 send a routing protocol, i.e., RIP, to a router 3 at regular intervals (STEP S1), for example, 30 seconds in general, and send information of a segment, i.e., a network, subordinate to the own terminals to a center LAN 2.

Figure 7:
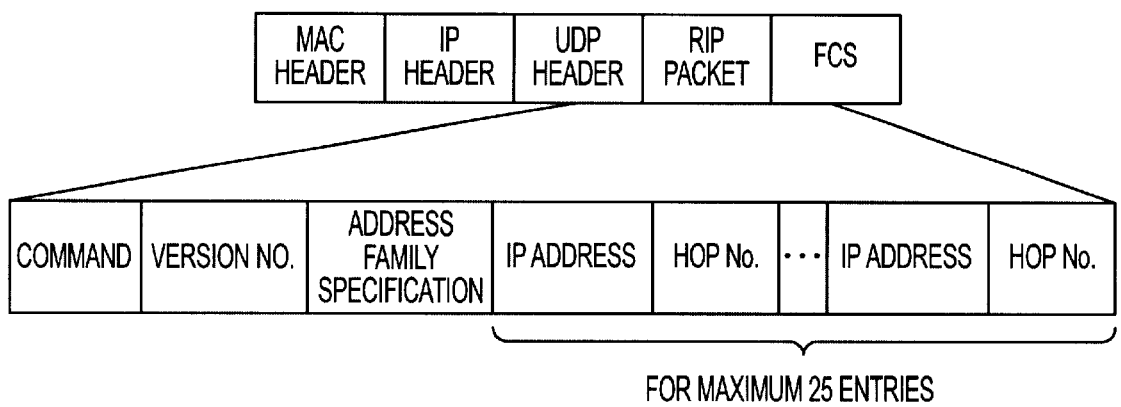
FIG. 7 illustrates one example of a format in a routing protocol packet (RIP).

In here, a structural example of a routing protocol (RIP) packet format is shown in FIG. 7. In other words, the device 10 sends the information of a segment R0, and the device 11 sends the information of the segment R1. The router 3 forms a routing table illustrated in FIG. 8 inside according to the above-described information.

The router 3 recognizes which terminal is subordinate to which device according to the routing table to make LAN communications enable.

The monitor device 7 performs polling for each device 10, 11 and 12 at regular intervals and monitors existences of a failure according to the reply for the polling.

A case where a terminal 80 starts facilitating LAN communications with a host on an Internet 4 will be now considered. At first, the terminal 80 queries the MAC address for the IP address ($IP_{R01}$) set in the gateway definition of the terminal according to an ARP request (ARP protocol) (STEP S3-1, S3-2, S3-3). Thereby, the device 10 informs the terminal 80 that the address is $MAC_{\#OR}$ according to the ARP reply (STEP S4-1, S4-2, S4-3).

The terminal 80 stores the information in an ARP table shown in FIG. 9 thereof. Then, the terminal 80 uses the above-described MAC address ($MAC_{\#OR}$) to send the data (info) of real LAN communication (STEP S5-1, S5-2, S5-3).

The device 10 which receives the data (info) executes the ARP protocol for the router 3, similarly to the above-described case (STEP S6) and repeats the above-described received data (info) to the router 3. Finally, the data (info) is repeated to the host on the Internet 4 (STEP S7).

Figure 10:
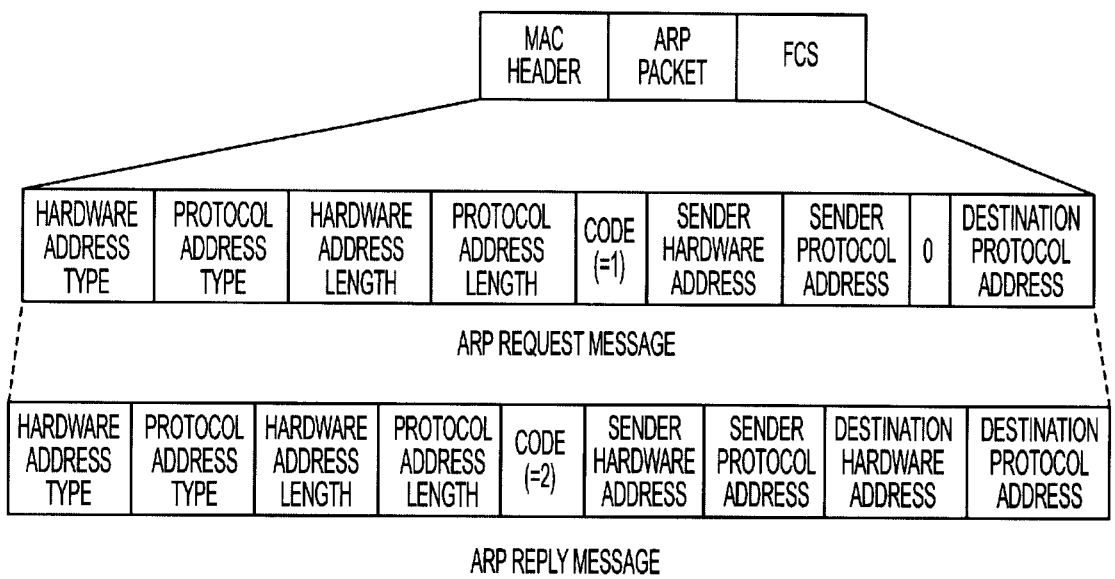
FIG. 10 illustrates one example of an ARP packet format.

One example of a request message from the device 10 to the router 3 when executing the ARP protocol for the router 3 (STEP S6) and an ARP packet format of the reply message sent from the router 3 as described above are shown in FIG. 10.

The reply message sent from the host on the Internet 4 is also repeated in the reversed direction and is achieved to the terminal 80. Therefore, as shown in the step S8 of FIG. 6, the data (info) is exchanged between the host on the Internet 4 and terminal 80.

Figure 11:
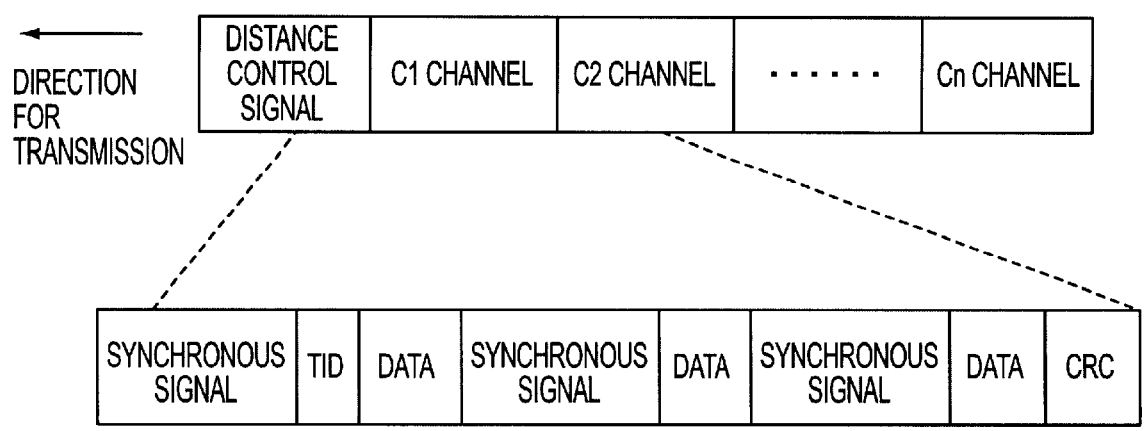
FIG. 11 illustrates a format of a transmission frame of data (info) transmitted from a central device (#0) 10 to a host on an internet 4.

The format of transmitted frame of the data (info) sent from the device 10 to the host on the Internet 4 in this case is as shown in FIG. 11. The format includes a terminal ID (TID) and data following a synchronous signal. The data following the synchronous signal is repeated, and an error check cyclic code CRC is attached at the end of the repetition.

Figure 12:
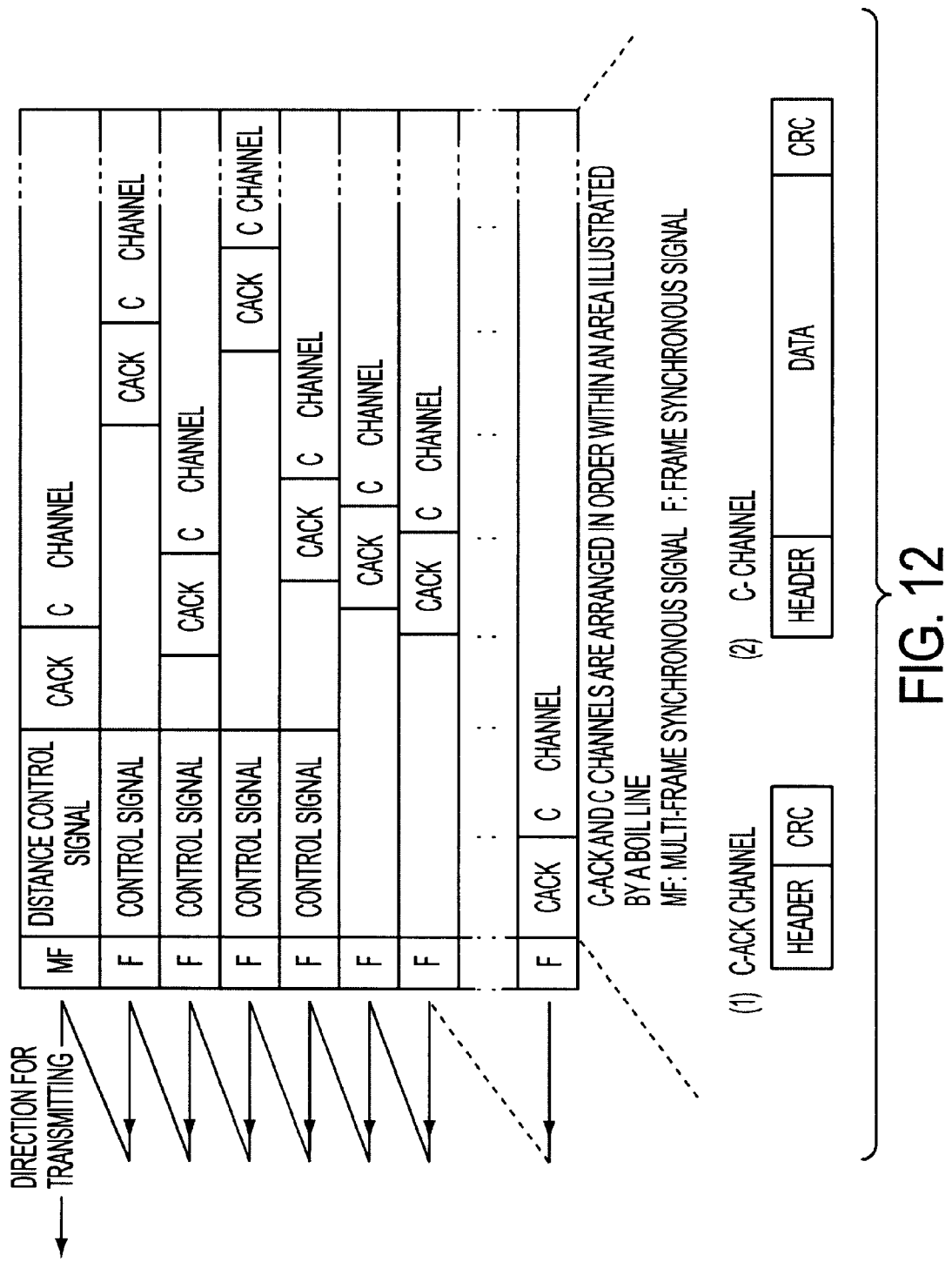
FIG. 12 illustrates data (info) and a multi-frame transmitted from a host on Internet 4 to a central device (#0) 10.
Figure 13:
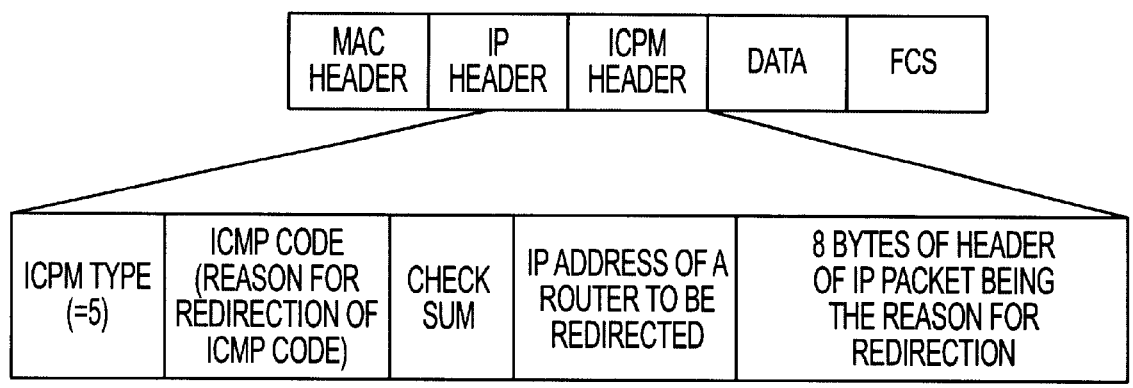
FIG. 13 is an example of a format of an ICMP redirect message.

On the other hand, the data (info) sent from the host on the internet 4 to the device 10 is transmitted with a multi-frame format as shown in FIG. 12. MF means a multi-frame synchronous signal, and F means a frame synchronous signal. ACK and channel signals are alternatively located in a frame.

An ACK signal is formed of a header and an error check cyclic code, and a channel signal is formed of a header, data and an error check cyclic code.

In this example, when the terminal 80 sends the data to the above-described host, the ARP protocol is omitted if the above-described MAC address exists on the ARP table stored in the terminal 80.

However, it is general to erase the information corresponding to the IP and MAC addresses from the ARP table if the information is not used for twenty minutes.

Figure 14:
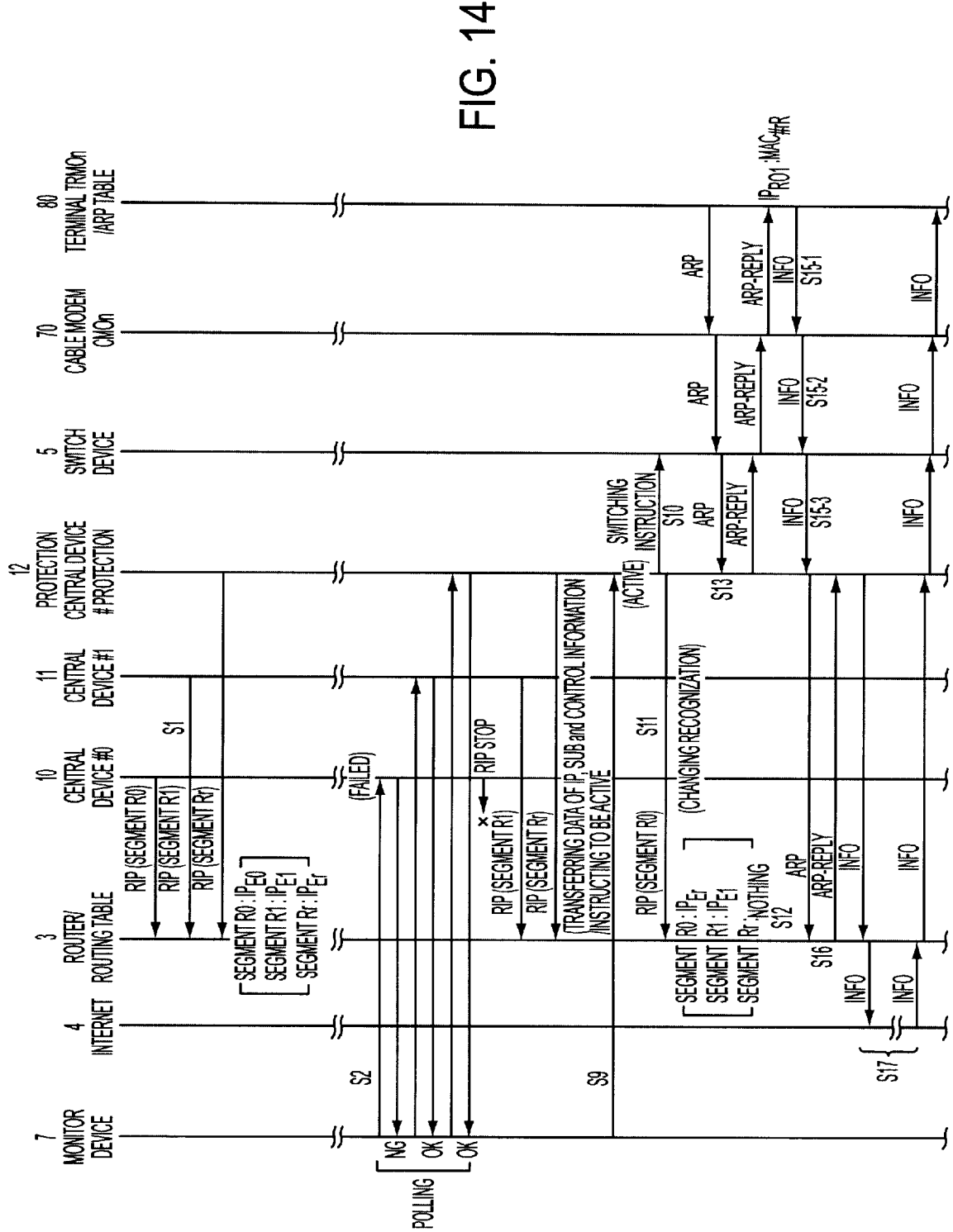
FIG. 14 illustrates a sequence of a LAN communication when a failure occurs on a central device (#0) 10.

FIG. 14 illustrates a sequence of LAN communication when a failure occurs on the device 10. The device 10 and the protection device 12 transmit routing protocols, such as a RIP, at regular intervals and respectively transmit the data of each subordinate segments, i.e., networks (STEP S1).

In other words, the device 10 transmits the information of the segment R0, and the device 11 transmits the information of the segment R1. The router 3 forms a routing table inside according to each information.

The monitor device 7 performs polling of each devices 10, 11 and 12 to detect the failure on the device 10 (STEP S2). The monitor device 7 further transfers the IP address ($IP_{R01}$), the sub net mask ($SUB_{R0}$) and the control information including CM0n of the subordinate cable modem on the transmission path side of the failed device 10 to the protection device 12. Then, the monitor device 7 instructs the device 12 to transit the condition to active (STEP S9). In here, it is also possible that the device 10 informs the failure detection to the monitor device 7 by itself.

The protection device 12 instructs the switch device 5 to connect the own device instead of the device 10. The monitor device 7 may directly perform this instruction to the switch 5, too.

The active device 12 starts sending the routing protocol, such as a RIP, at regular intervals and informs the router 3 that the segment R0 is subordinate to the device 12 (STEP S11).

The router 3 changes the contents on the routing table when the device 10 stops sending the RIP and the protection device 12 starts sending the RIP (STEP S12).

When the terminal 80 starts LAN communications with the host on the internet 4, the terminal 80 queries the MAC address for the IP address ($IP_{R01}$) set in the gateway definition thereof to the host according to the ARP protocol at first (STEP S13). Then, the device 12 informs the terminal 80 that the address is $MAC_{\#rR}$. The terminal 80 stores the information in the ARP table thereof (STEP S14).

Next, the terminal 80 uses the above-described MAC address ($MAC_{\#rR}$) to send the data (info) of real LAN communications (STEP S15-1, S15-2, S15-3).

The device 12, which receives the data (info), executes the ARP protocol for the router 3 as described above (STEP S16). After that, the router 3 repeats the received data (info), and the data (info) is repeated to the host on the internet 4, finally (STEP S17).

Figure 15:
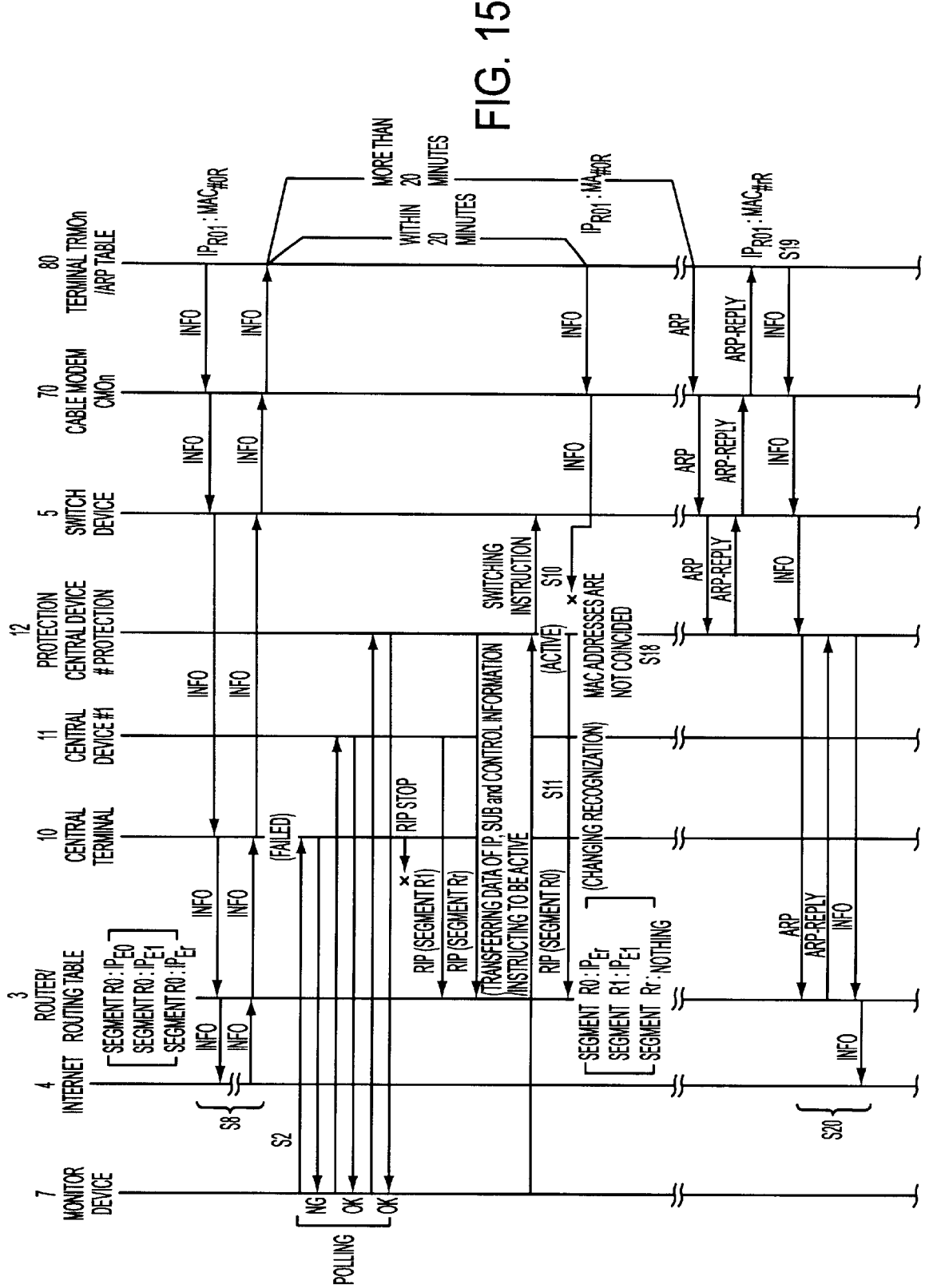
FIG. 15 illustrates a sequence of a LAN communication when a failure occurs on a central device (#0) 10 while a terminal (TRMOn) 80 is facilitating LAN communications with a host on internet 4.

FIG. 15 illustrates a sequence of LAN communications when a failure occurs on the device 10 while the terminal 80 facilitates LAN communications with the host on the internet 4.

In FIG. 15, the terminal 80 facilitates LAN communications according to the sequence illustrated in FIG. 6, and the MAC address ($MAC_{\#OR}$) is stored for the IP address ($IP_{R01}$) in the ARP table.

As explained in FIG. 14, the monitor device 7 detects the failure on the device 10, makes the protection device 12 active, switches the switch device 5 (STEP S10), and changes the contents on the routing table on the router 3 (STEP S11).

In here, since the terminal 80 continuously transmits the data (info), and the correspondence between the IP address ($IP_{R01}$) and the MAC address ($MAC_{\#OR}$) is registered on the ARP table of the terminal 80, the ARP protocol is omitted. Then, the MAC address ($MAC_{\#OR}$) stored on the transmitted data (info) does not coincide with the MAC address ($MAC_{\#rR}$) on the transmission path side of the device 12. Therefore, the device 12 can not receive the data (STEP S18).

After erasing the correspondence between the IP address ($IPR_{R01}$) and the MAC address ($MAC_{\#OR}$) from the ARP table in the terminal 80, i.e., after twenty minutes have been elapsed in general, the terminal 80 executes the ARP protocol again. Therefore, the device 12 informs the MAC address ($MAC_{\#rR}$) to the terminal 80. Then, the terminal 80 stores the information on the ARP table thereof again (STEP S19).

Thereby, the terminal 80 can resume LAN communications by using the above-described MAC address ($MAC_{\#rR}$) (STEP S20).

Figure 16:
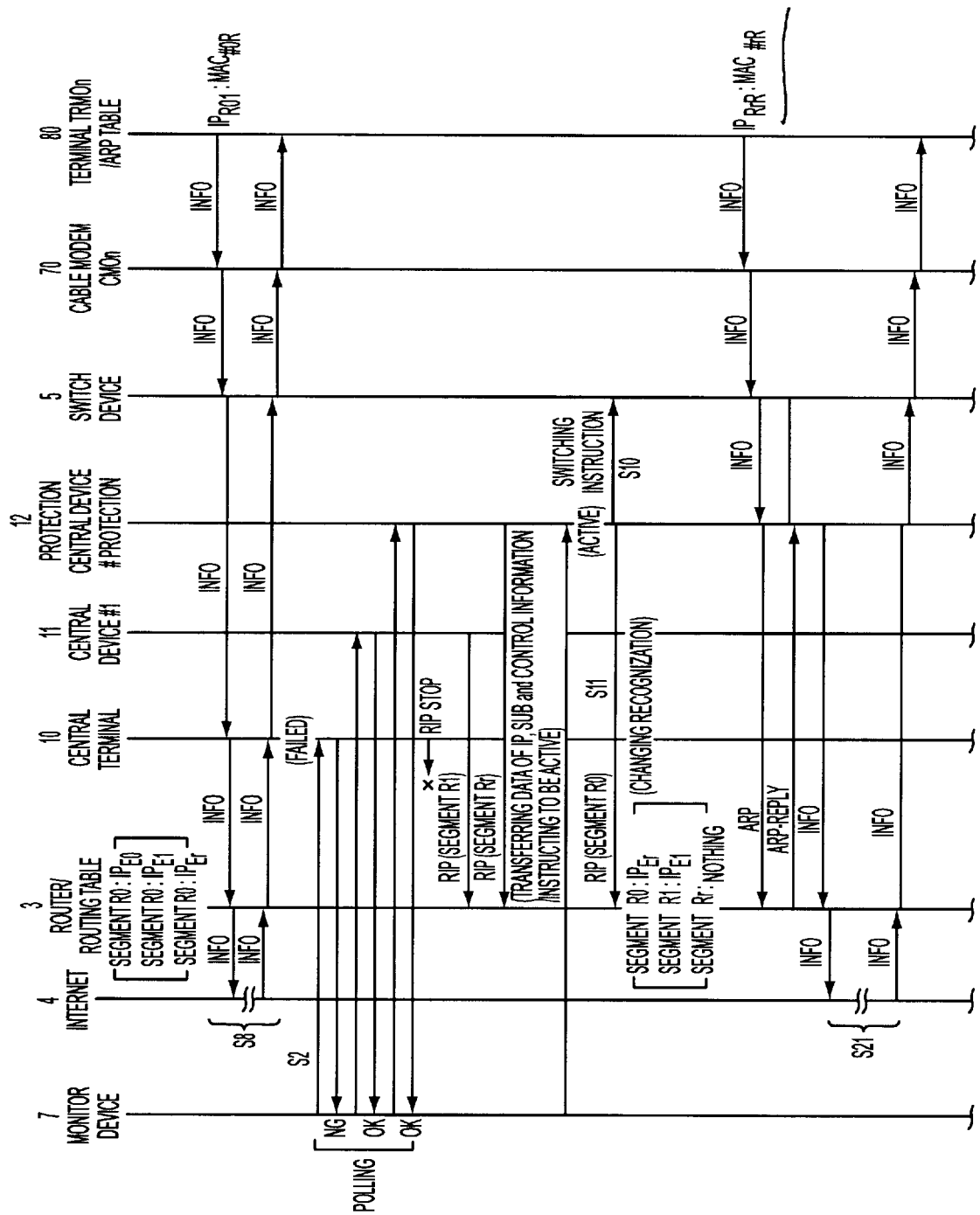
FIG. 16 illustrates a sequence when a monitor device 7 maintains a MAC address on a transmission path side of a central device (#0) 10 and transmits the information to a protection device (#protection) 12 as data corresponding to the sequence shown in FIG. 14.

FIG. 16 illustrates a sequence when the monitor device 7 maintains the MAC address on the transmission path side of the device 10 and transfers it to the protection device 12 as information in opposite to the sequence of FIG. 15.

When the terminal 80 continuously sends the data (info) after switching because of the failure on the device 10, the MAC address ($MAC_{\#OR}$) described in the transmitted data (info) coincides with the MAC address ($MAC_{\#OR}$) on the transmission path side of the device 12. This means that the device 12 can receive the data (info), and therefore, the data (info) can be continuously transferred.

Figure 17:
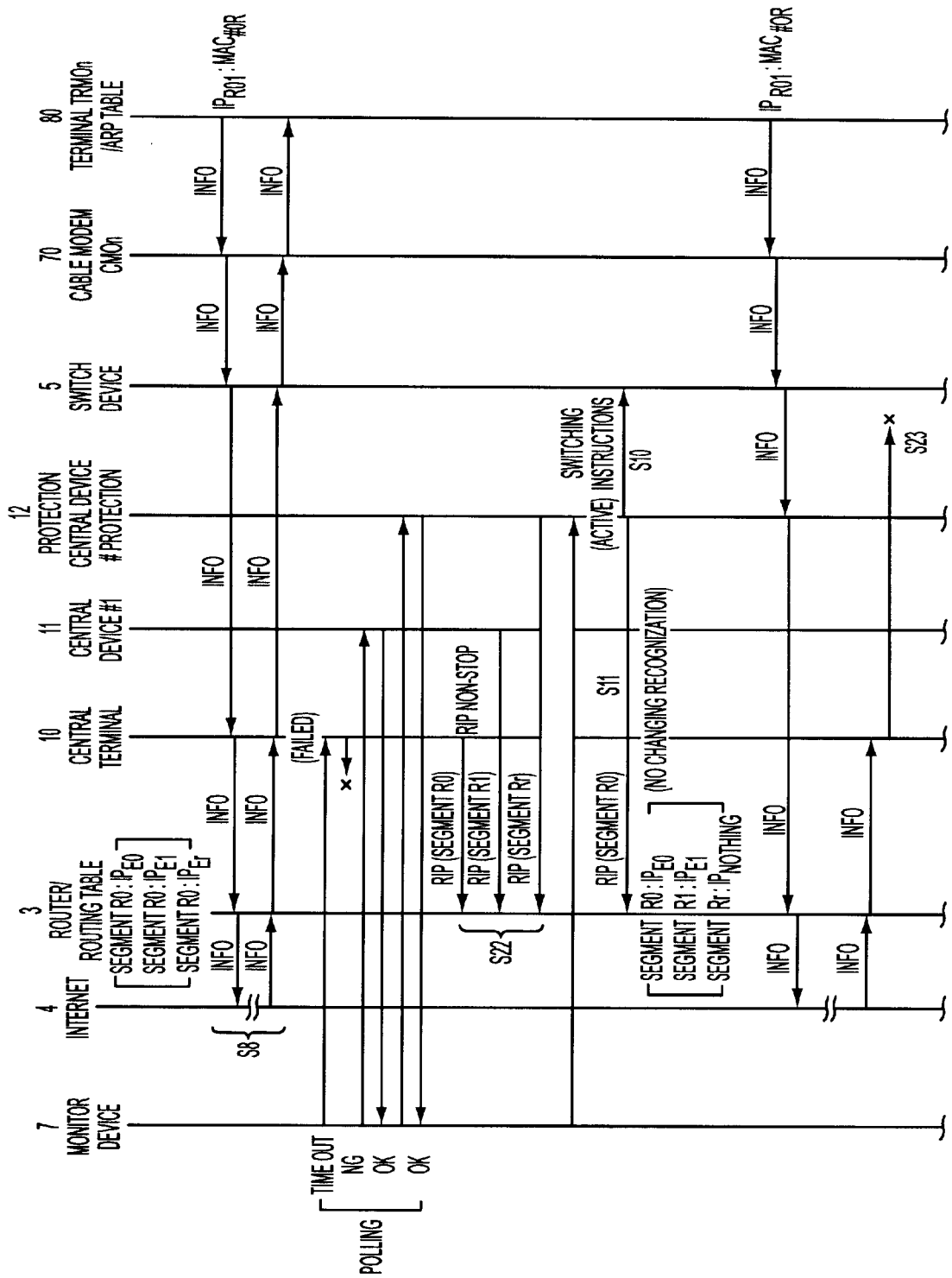
FIG. 17 illustrates a sequence when a central device (#0) continuously transmits RIP information even after the failure occurs.

FIG. 17 illustrates a sequence when the RIP is continuously sent even after a failure occurred on the device 10.

The device 12 becomes active (STEP S10) and starts sending the RIP, and the failed device 10 continuously sends the RIP (STEP S22). Then, the router 3 does not change the routing table for the segment R0.

Therefore, the router 3 repeats the data (info) from the host on the internet 4 to the device 10 in the same state. Accordingly, the data (info) does not reach the terminal 80 (STEP S23).

Figure 18:
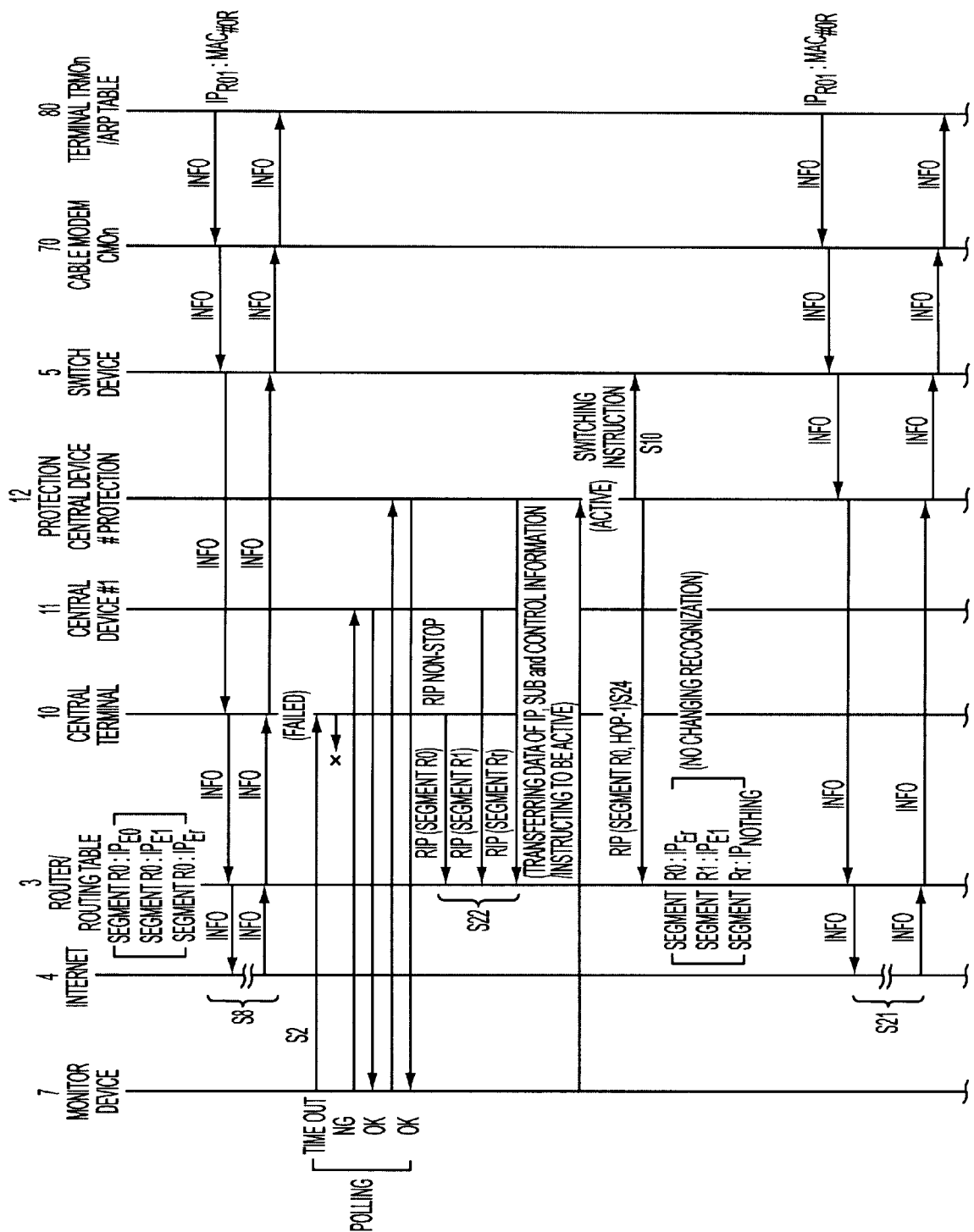
FIG. 18 shows an example in which a HOP number of the RIP information a central device (#protection) 12 transmits is smaller than that of the RIP information a central device (#0) 10 transmits corresponding to the sequence shown in FIG. 17.

FIG. 18 illustrates a sequence when the HOP number of the RIP information the protection device 12 sends is smaller than that of the RIP information the device 10 sends.

Thereby, the router 3 recognizes that the segment R0 is subordinate to the protection device 12 and changes the routing table (STEP S24).

Accordingly, the router 3 which receives the data (info) sent from the host on the internet 4 changes the destination for repeating to the protection device 12, and therefore, the data (info) reaches the terminal 80.

Figure 19:
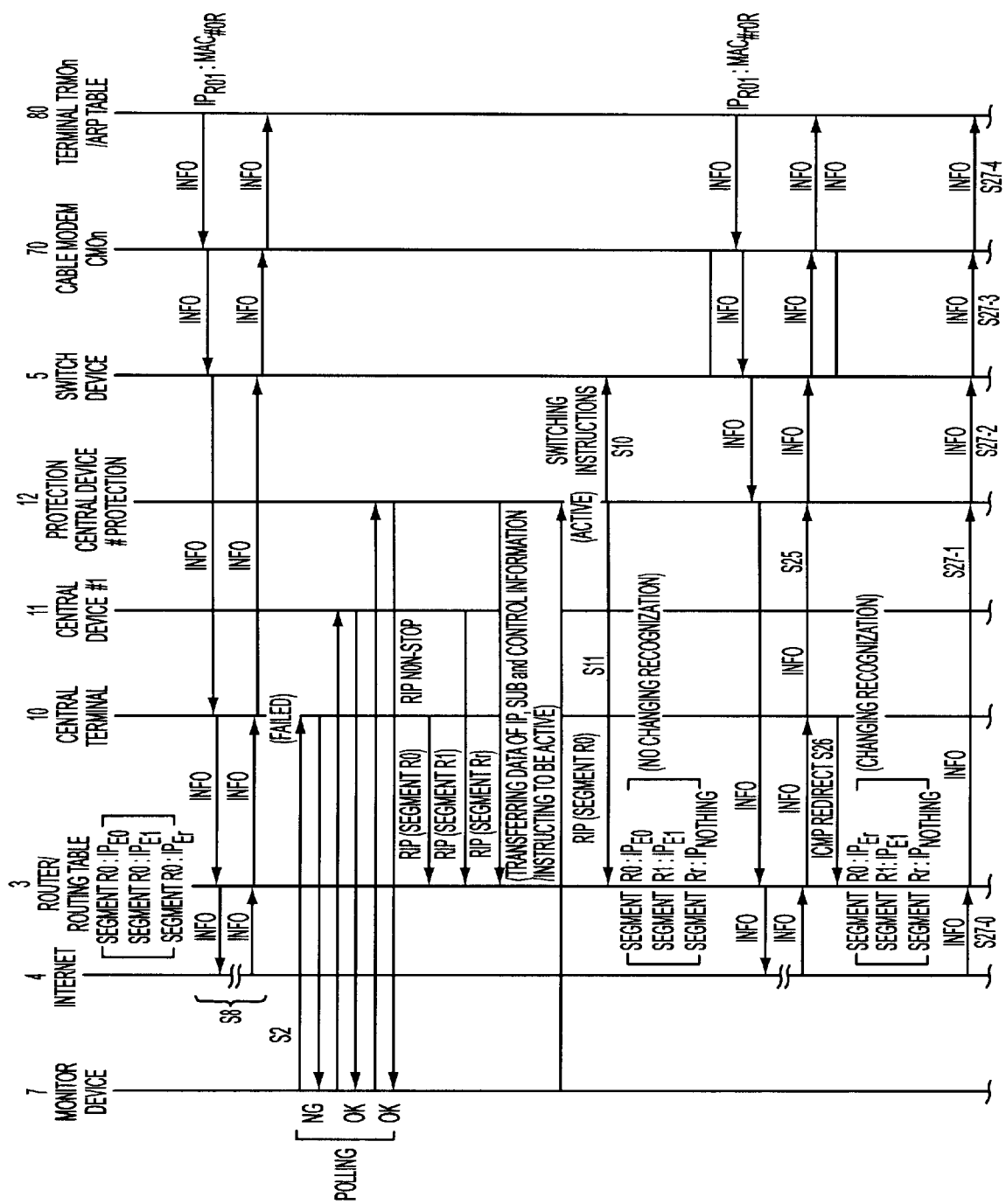
FIG. 19 shows an example in which the failed central device (#0) 10 which receives data from a router RT 3 transmits the data to a central device (#protection) 12 and concurrently transmits an ICMP redirect message to a router RT 3.

FIG. 19 shows an example where the failed device 10 which receives data (info) from the router 3 transmits the data to the protection device 12 (STEP S25) and concurrently transmits an ICMP redirect message to the router 3 (STEP 26). Thereby, the router 3 recognizes that the segment R0 is subordinate to the protection device 12 and changes the routing table. Therefore, the router 3 which receives the data (info) sent from the host on the internet 4 changes the destination for repeating to the protection device 12, and therefore, the data (info) reaches the terminal 80 (STEPS S27-0 to S27-4).

FIG. 20 shows an example of operational sequence for confirming the resumption and resuming the system after restoring the failure on the device 10 which is switched to the protection device 12 according to the sequence shown in FIG. 14.

After the failure on the device 10 is restored (STEP S28), the monitor device 7 transfers an IP address ($IP_{Rr1}$), a sub net mask ($SUB_{Rr}$) and the control information including CMrn of the subordinate cable modem on the transmission path side of the protection device 12 to the device 10. Additionally, the monitor device 7 instructs the device 10 to transit to an active status (STEP S29).

The active device 10 starts sending the routing protocol, such as the RIP, at regular intervals and informs the router 3 that the segment Rr is subordinate to the device 10. The router 3 changes the contents on the routing table according to the command of starting transmission of the RIP information of the device 10.

When the test terminal 80 starts facilitating the LAN communications with the host on the internet 4 to confirm the resumption of the device 10, the switch 5 queries a MAC address for the IP address ($IP_{Rr1}$) set in the gateway definition of the terminal according to an ARP protocol at first. For this query, the device 10 informs that the address is $MAC_{\#OR}$ as an ARP reply (STEP S31).

The terminal 80 stores the information on the ARP table thereof (STEP S32). Next, the terminal 80 uses the above-described MAC address ($MAC_{\#OR}$) to transmits the data (info) of the real LAN communications (STEP S33-1, S33-2 and S33-3). The device 10 that receives the data (info) performs the ARP protocol for the router 3, similarly to the above-described case. After that, the device 10 repeats the received data (info) to the router 3 (STEP S34). Finally, the data (info) is repeated to the host on the internet 4 (STEP S35).

Additionally, the monitor device 7 transfers the original IP address ($IP_{R01}$), sub net mask ($SUB_{R0}$) and the control information including (CM0n) of the subordinate cable modem and instructs the device 10 to transit to an active status. After confirming the resumption of the device 10, the protection device 12 is switched to the device 10 to return to a normal status. The monitor device 7 concurrently transfers the IP address ($IP_{Rr1}$), sub net mask ($SUB_{Rr}$) and the control information including CMrn of the subordinate cable modem on the original transmission path of the device 10 to the protection device 12 and instructs the device 12 to transit to an active condition (STEP S36).

The protection device 12 instructs the switch 5 to connect the device 10 instead of the own device 12. The monitor device 7 can perform this instruction to the switch device 5 by itself.

The active device 10 and the protection device 12 start sending the routing protocol, such as a RIP, at regular intervals and inform the router 3 that the segment Rr is returned to be subordinate to the protection device 12. Thereby, the router 3 changes the contents on the routing table according to the command for starting the transmission of the RIP in the terminals 10 and 12 (STEP S37).

Although the present invention has been described with reference to embodiments, the invention is not restricted to those. LAN communications can be continued without changing setting information of a terminal when a failure occurs on a cable modem of the terminal according to the present invention.

Additionally, it is possible to avoid a non-active condition of the communication to ensure changes of a routing table in a router. Therefore, a reliability of a cable modem system can be improved sharply.

Further, it can be simplified to confirm a resumption of a failed terminal using a test terminal.

The present invention may be embodied in other specific forms without departing from the sprit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for switching a plurality of central devices including N working central devices and one protection central device of a N+1 redundancy structure provided on a LAN center, to the CATV transmission path side of which terminal devices are connected each through a cable modem, having router functions forming segments respectively at the sides of the LAN center and the CATV transmission path, and a working central device transmitting routing information of the segment on the CATV transmission path side to inform the LAN center segment of an existence of the segment on said transmission path side, so that the terminal devices are connected to appropriate networks via the LAN center, the method comprising the steps of:

maintaining control information of the plurality of working central devices and the protection central device to be monitored;

detecting failure of a working central device by regularly polling the N working central devices, switching the detected, failed working central device to the protection central device to connect the plurality of central devices to the CATV transmission path;

transferring the maintained control information of the failed central device to the protection central device; and setting the protection central device to an active status according to the transferred control information.

2. The switching method according to claim 1, wherein the control information of the plurality of working central devices and the protection central device to be monitored are a network address of the segment on the CATV transmission path side and control information of cable modems accommodated under said plurality of working central devices and the protection central device.

3. The switching method according to claim 2, wherein the information transferred to the protection central device includes a physical address (MAC address), and said protection central device additionally uses said physical address to activate.

4. The switching method according to claim 1, wherein the failed central device stops sending routing information after a failure is informed.

5. The switching method according to claim 2, wherein the failed central device stops sending routing information after a failure is informed.

6. The switching method according to claim 1, wherein distance (HOP number) or cost data of the routing information the switched protection central device sends is made to be smaller than that of the information the working central device sends.

7. The switching method according to claim 2, wherein distance (HOP number) or cost data of the routing information the switched protection central device sends is made to be smaller than that of the information the working central device sends.

8. The switching method according to claim 1, wherein the data sender is informed that the failed central device is switched to the protection central device according to an internet control message protocol (ICMP) redirect message when receiving the data sent to the segment on the CATV transmission path after a failure is informed.

9. The switching method according to claim 2, wherein the data sender is informed that the failed central device is switched to the protection central device according to an internet control message protocol (ICMP) redirect message when receiving the data sent to the segment on the CATV transmission path after a failure is informed.

10. The switching method according to claim 1, wherein resumption confirmation is performed by connecting the terminal and the failed central device, the control information of the protection central device is transferred from the monitor device to the failed central device, and the failed central device is made to be active according to the transferred information after the failure on the failed central device is restored.

11. The switching method according to claim 2, wherein resumption confirmation is performed by connecting the terminal and the failed central device, the control information of the protection central device is transferred from the monitor device to the failed central device, and the failed central device is made to be active according to the transferred information after the failure on the failed central device is restored.

12. A cable modem center device having a plurality of central devices including N working central devices and one protection central device of a N+1 redundancy structure provided on a LAN center, to the CATV transmission path side of which terminal devices are connected each through a cable modem, and having router functions forming segments respectively at the sides of the LAN center and the CATV transmission path, and a working central device transmitting routing information of the segment on the CATV transmission path side to inform the LAN center segment of an existence of the segment on said transmission path side, so that the terminal devices are connected to appropriate networks via the LAN center, the cable modem center device comprising;

a switch device provided between said plurality of central device and said CATV transmission path for switching a failed one of the plurality of central devices to said protection central device and connecting said plurality of center devices and said CATV transmission path; and a monitor device for monitoring said plurality of central devices, maintaining control information of the plurality of working central devices and the protection central device to be monitored, detecting failure of a working central device by regularly polling the N working central devices, switching the detected, failed working central device to the protection central device to connect the plurality of central devices to the CATV transmission path, transferring the maintained control information of the failed central device to the protection central device, and setting the protection central device to an active status according to the transferred control information.

13. The cable modem center system according to claim 12, wherein the monitor device includes a physical address (MAC address) of the segment on the transmission path of the working central device as the maintained information and the information transferred to the protection central device, and said protection central device additionally uses said physical address to activate.

14. The cable modem center according to claim 12, wherein the failed central device stops sending routing information after a failure is informed.

15. The cable modem center according to claim 13, wherein the failed central device stops sending routing information after a failure is informed.

16. The cable modem center system according to claim 12 wherein distance (HOP number) or cost data of the routing information the switched protection central device sends is made to be smaller than that of the information the working central device sends.

17. The cable modem center system according to claim 13 wherein distance (HOP number) or cost data of the routing information the switched protection central device sends is made to be smaller than that of the information the working central device sends.

18. The cable modem center system according to claim 12, wherein it is informed to the data sender that the failed central device is switched to the protection central device according to an internet control message protocol (ICMP) redirect message when receiving the data to the segment on the CATV transmission path after a failure is informed.

19. The cable modem center system according to claim 12, wherein a resumption confirmation is performed by connecting the terminal and the failed central device, the control information of the protection central device is transferred from the monitor device to the failed central device, and the failed central device is made to be active according to the transferred information after the failure on the failed central device is restored.

* * * * *